(12) United States Patent
Petri et al.

(10) Patent No.: US 11,836,260 B2
(45) Date of Patent: Dec. 5, 2023

(54) DATA SECURITY

(71) Applicant: Arm Limited, Cambridge (GB)

(72) Inventors: Gustavo Federico Petri, Cambridge (GB); Guilhem Floréal Bryant, Cambridge (GB); Dominic Phillip Mulligan, Cottenham (GB); Anthony Charles Joseph Fox, Cambridge (GB)

(73) Assignee: ARM LIMITED, Cambridge (GB)

( * ) Notice: Subject to any disclaimer, the term of this patent is extended or adjusted under 35 U.S.C. 154(b) by 48 days.

(21) Appl. No.: 17/104,718

(22) Filed: Nov. 25, 2020

(65) Prior Publication Data

US 2022/0164458 A1 May 26, 2022

(51) Int. Cl.
| | | |
|---|---|---|
| *G06F 21/60* | (2013.01) | |
| *H04L 9/08* | (2006.01) | |
| *G06F 21/64* | (2013.01) | |
| *H04L 9/32* | (2006.01) | |

(52) U.S. Cl.
CPC ............ *G06F 21/604* (2013.01); *G06F 21/64* (2013.01); *H04L 9/0816* (2013.01); *H04L 9/0894* (2013.01); *H04L 9/3236* (2013.01); *H04L 9/3271* (2013.01); *G06F 21/602* (2013.01); *G06F 2221/2149* (2013.01)

(58) Field of Classification Search
CPC ........ G06F 21/60; G06F 21/62; G06F 21/604; G06F 21/64; G06F 21/6218; G06F 21/6209; H04L 9/08; H04L 9/0816; H04L 9/0894; H04L 9/32; H04L 9/3236; H04L 9/327
See application file for complete search history.

(56) References Cited

U.S. PATENT DOCUMENTS

| | | | | |
|---|---|---|---|---|
| 10,361,868 | B1 * | 7/2019 | Baker | G06F 11/362 |
| 2016/0180061 | A1 * | 6/2016 | Pogorelik | G06F 21/10 |
| | | | | 713/189 |
| 2016/0350561 | A1 * | 12/2016 | Poiesz | G06F 21/53 |
| 2021/0258308 | A1 * | 8/2021 | Avetisov | H04L 9/088 |
| 2021/0273812 | A1 * | 9/2021 | Hardin | H04L 9/0822 |
| 2021/0320947 | A1 * | 10/2021 | Moridi | G06F 21/6218 |
| 2022/0035922 | A1 * | 2/2022 | Yang | H04L 63/20 |

\* cited by examiner

*Primary Examiner* — Shaqueal D Wade-Wright
(74) *Attorney, Agent, or Firm* — Nixon & Vanderhye, PC (57) ABSTRACT

A data processing system is provided, which comprises receiving circuitry for receiving, from a requester, a request to use decrypted data obtained by decrypting encrypted data. Trusted execution circuitry provides a trusted execution environment. The trusted execution circuitry is configured to: securely store a policy, acquire a key within the trusted execution environment, where the key is associated with the decrypted or encrypted data, and respond to the request based on the policy and one or more characteristics of the requester.

16 Claims, 5 Drawing Sheets

DATA SECURITY

TECHNICAL FIELD

The present disclosure relates to data processing. More particularly, it relates to security.

DESCRIPTION

It is desirable for a provider of data to maintain an element of control over how that data is used after having provided it to a third party.

SUMMARY

Viewed from a first example configuration, there is provided a data processing system comprising: receiving circuitry configured to receive, from a requester, a request to use decrypted data obtained by decrypting encrypted data; trusted execution circuitry configured to provide a trusted execution environment, wherein the trusted execution circuitry is configured to: securely store a policy; acquire a key within the trusted execution environment, wherein the key is associated with the decrypted or encrypted data; and respond to the request based on the policy and one or more characteristics of the requester.

Viewed from a second example configuration, there is provided a computer-implemented data processing method comprising: receiving from a requester, a request to use decrypted data obtained by decrypting encrypted data; providing a trusted execution environment, wherein the trusted execution environment: securely stores a policy; acquires a key, wherein the key is associated with the decrypted or encrypted data; and responds to the request based on the policy and one or more characteristics of the requester.

Viewed from a third example configuration, there is provided a data processing system comprising: means for receiving from a requester, a request to use decrypted data obtained by decrypting encrypted data; means for providing a trusted execution environment; means for securely store a policy; means for acquiring a key within the trusted execution environment, wherein the key is associated with the decrypted or encrypted data; and means for responding to the request based on the policy and one or more characteristics of the requester.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Before discussing the embodiments with reference to the accompanying figures, the following description of embodiments is provided.

In accordance with one example configuration there is provided a data processing system comprising: receiving circuitry configured to receive, from a requester, a request to use decrypted data obtained by decrypting encrypted data; trusted execution circuitry configured to provide a trusted execution environment, wherein the trusted execution circuitry is configured to: securely store a policy; acquire a key within the trusted execution environment, wherein the key is associated with the decrypted or encrypted data; and respond to the request based on the policy and one or more characteristics of the requester.

The data processing system is provided with access to the data (in encrypted form), the key, and the policy by a data provider, which determines the policy for accessing the data. When the request to use the data is received from the requester by the data processing system, the data processing system determines whether the requirements of the policy are met or not in respect of the requested data. If they are met, then the encrypted data is accessed by the data processing system using the key and the request from the requester can be satisfied. The processing that is performed on the data in order to answer the request from the requester is handled within a trusted execution environment. The trusted execution environment provides confidentiality of the contents of the trusted execution environment and a tamper resistant mechanism, in order to inhibit or prevent tampering. Optionally, the environment might also be subjectable to attestation although this is not required. Thus the contents are kept confidential from outside the trusted execution environment and are protected from tampering. That is to say that the trusted execution environment cannot be accessed in such a manner as to gain access to the data in its decrypted form (unless permitted by the policy). In this way, the way in which the data is used can be securely controlled by the data according to the associated policy. Furthermore, the trusted execution environment, which has access to the key, cannot be tampered with so as to leak the key. This can be achieved by the use of secure and/or isolated memory. The key could be a symmetric key, or could be, for instance, the private key of an asymmetric (e.g. public/private) key pair. Note that the term "trusted execution environment" is used to refer to an execution environment that the trusted execution circuitry is prepared to trust. It could be that other entities in the system (such as the data provider) do not trust the trusted execution environment, or do not immediately trust the trusted execution environment. In some embodiments, the policy forms part of the trusted execution environment software itself, and the two are not necessarily distinct.

In some examples, the data processing system comprises: storage circuitry configured to store the encrypted data. In this way, the encrypted data can be stored locally to the data processing system. In other examples, the storage location of the encrypted data could be separate to the data processing system. Since the data processing system has access to the key that is used to access the data, the data can remain secure in its encrypted form in a different location to the data processing system.

In some examples, the trusted execution environment is immutable. For example, the trusted execution environment could be implemented using read-only memory (ROM). Such memory is such that, once written to, a further write on the circuitry is not possible. In this way, the trusted execution environment cannot be modified once it has been written. This increases security since the behaviour or operation of the trusted execution environment cannot be modified e.g. by a third party. This therefore makes it very difficult for a third party to cause the trusted execution environment to do something that was not intended or not originally programmed and thereby provides a strong 'guarantee' of integrity of the trusted execution environment. The use of ROM is therefore one way in which the contents of the trusted execution environment cannot be tampered with.

In some examples, the policy is stored securely by storing the policy within the trusted execution environment. By storing the policy within the trusted execution environment, whose contents are kept confidential and tamper-proof, the policy itself cannot be changed in an unauthorised manner. For example, a nefarious third party cannot modify the policy in order to allow completely free usage of data. Mechanisms might of course exist for the provider of the data to modify the policy over time. For instance, the provider of the data may decide to provide increased access to the data or may decide to further restrict access to the data. Such authorisation could be achieved by the use of digital signatures in order to verify a change in instruction from the original data provider. In embodiments in which the policy forms part of the trusted execution environment software itself, a modification to the policy could be achieved by unloading an old trusted execution environment (with the old policy) and loading in a new trusted execution environment with the revised policy.

In some examples, the trusted execution circuitry is configured to obtain attestation of the trusted execution environment. Attestation is a process in which a third party can be convinced that the behaviour of, for instance, a trusted execution environment has been assessed. Attestation can be performed using, for instance, Intel's Enhanced Privacy ID (EPID) protocol that uses Intel's Attestation Service (IAS) or Arm's Platform Security Architecture (PSA) attestation. In some of these examples, attestation is obtained by the issuance of a token.

In some examples, the trusted execution circuitry is configured to obtain the attestation by providing a digitally signed checksum or hash (e.g. a cryptographic hash) that corresponds with the trusted execution environment (or part of it) to a provider of the data. The hash or checksum of the trusted execution environment can be compared against a list of hashes/checksums that correspond with trusted execution environments whose behaviour has been checked and authorised. For instance, the party performing the attestation may have seen the source code of the trusted execution environment that produces the object code on which the hash is produced. By reviewing the source code, it is possible to say with a reasonable degree of certainty, that the behaviour of the trusted execution environment is known. Any nefarious intent of the trusted execution environment, any security holes, or any vulnerabilities, can also be detected in which case such attestation may not be provided. If the hash/checksum of the execution environment is on the list, then attestation of the environment is achieved. The hash or checksum might be produced by, for instance, firmware of the data processing system so that the trusted execution circuitry remains independent from the elements used to verify its integrity. The hash or checksum algorithm that is used is one in which the set of possible outputs is smaller than the set of possible inputs. Such checksums or hashes are such that even a small change to the trusted execution environment (e.g. the memory used by the trusted execution circuitry to execute the trusted execution environment, and/or the memory used to store the trusted execution environment) will result in a (potentially large) change to the hash or checksum. As a result of this, if the behaviour of the trusted execution environment is changed even slightly, a change in the working memory results and as a result, a change in the checksum or hash will occur. Typically, it is considered to be non-trivial to identify two inputs that produce the same checksum or hash, and so the modification of the trusted execution environment cannot simply be carefully tailored to produce a desired behaviour (such as leaking data) while not altering the checksum or hash. In some embodiments, the attestation protocol might require periodic checksums or hashes to be made (and digitally signed). In other embodiments, the protocol might rely on a hardware mechanism (such as secure memory) to prevent or inhibit the trusted execution environment from being modified after attestation has been completed. Where attestation involves the issuance of a token, the token comprises the checksum or hash and it is the token itself that is signed (together with a challenge response if one is required). The token could also comprise metadata used for the execution environment.

In some examples, in response to a failure to obtain the attestation of the trusted execution environment, the trusted execution circuitry is configured to perform an error action.

In some examples, the error action is to inhibit execution of the trusted execution environment. There are a number of possible error actions that can be taken if the trusted execution environment changes in an unauthorised manner. However, in some examples, the trusted execution environment can have its execution halted or inhibited. This can be an appropriate action where the behaviour of the trusted execution environment could be in doubt. In order to limit damage that is caused by the behaviour of the trusted execution environment changing, a safest cause of action could be to simply inhibit further execution of that trusted execution environment.

In some examples, the checksum or hash corresponds with the trusted execution environment and a challenge received from the provider of the data; and the digitally signed checksum or hash is signed such that an origin of the checksum or hash can be authenticated. By providing a challenge at the time of attestation, it is possible to avoid a replay attack in which a previously generated checksum of an attested execution environment is provided a second time in order to obtain attestation. In these embodiments, the generated checksum or hash is a checksum of the trusted execution environment, and both this checksum/hash and a response to the challenge (e.g. a nonce) is digitally signed by the data processing apparatus (e.g. the trusted execution circuitry). This prevents checksums or hashes from being reused.

In some examples, the trusted execution circuitry is further configured to perform decryption on the encrypted data within the trusted execution environment to provide the decrypted data. Thus in these examples, the encrypted data is actively decrypted in order to provide decrypted data corresponding with the encrypted data. Either some or all of the decrypted data can then be provided to the requester based on the request made by the requester and also the policy. For instance, the requester may only request part of the data or the security policy may only permit part of the decrypted data to be provided to the requester regardless of its request.

In some examples, the request identifies a function to be performed on the decrypted data by the trusted execution circuitry to produce a result; and the trusted execution circuitry configured to respond to the request by providing the result based on the policy and one or more characteristics of the requester. Instead of directly providing the decrypted data, the data processing system performs (based on the policy) an operation on all or part of the decrypted data in order to provide a result. This result is then provided to the requester in response to the request. This can result in workload being distributed so that the requester need not perform particular data processing operations on the data.

In some examples, the trusted execution circuitry configured to respond to the request by providing the result without providing the decrypted data based on the policy and one or more characteristics of the requester. One situation in which this may be performed is in aggregation of multiple items of data. For example, the data policy for a survey could recite that data relating to individual survey results is not individually provided. However, the policy may permit an aggregation function (such as an average) to be performed on multiple results. This therefore allows the release of particular items of data, but only in a manner in which anonymity can be preserved. By providing the result without providing the decrypted data, the decrypted data itself can be kept secure whilst still enabling data requesters to have access to useful information.

In some examples, the trusted execution circuitry is configured to accept and respond to the request when the one or more characteristics of the requester correspond with one or more required characteristics specified by the policy. There are number of ways in which the policies can be implemented. However, in these examples, the policy provides a list of one or more required characteristics. When those characteristics match with the characteristics of the requester, the request made by the requester is fulfilled. This may involve providing the decrypted data or by providing the result of a requested function that is performed on the decrypted data as previously described.

In some examples, the one or more required characteristics comprise that the requester is a further trusted execution environment. By requiring that the requester also acts as or provides a trusted execution environment, it is possible to say with a degree of certainty that the behaviour of the further trusted execution environment can be trusted. In particular, it may be concluded that it would be very difficult for the data to be extracted from the further trusted execution environment. The security of the data can therefore be preserved after it has been released to the requester.

In some examples, the one or more required characteristics comprise that attestation of the further trusted execution environment has been performed by the trusted execution environment. One way of confirming the behaviour of the further trusted execution environment is by performing attestation on the further trusted execution environment by the trusted execution environment. This therefore extends that "attestation chain" so that the behaviour of any device that is known to operate on the data must be confirmed by the device that is providing that data.

Particular embodiments will now be described with reference to the figures.

Figure 1:
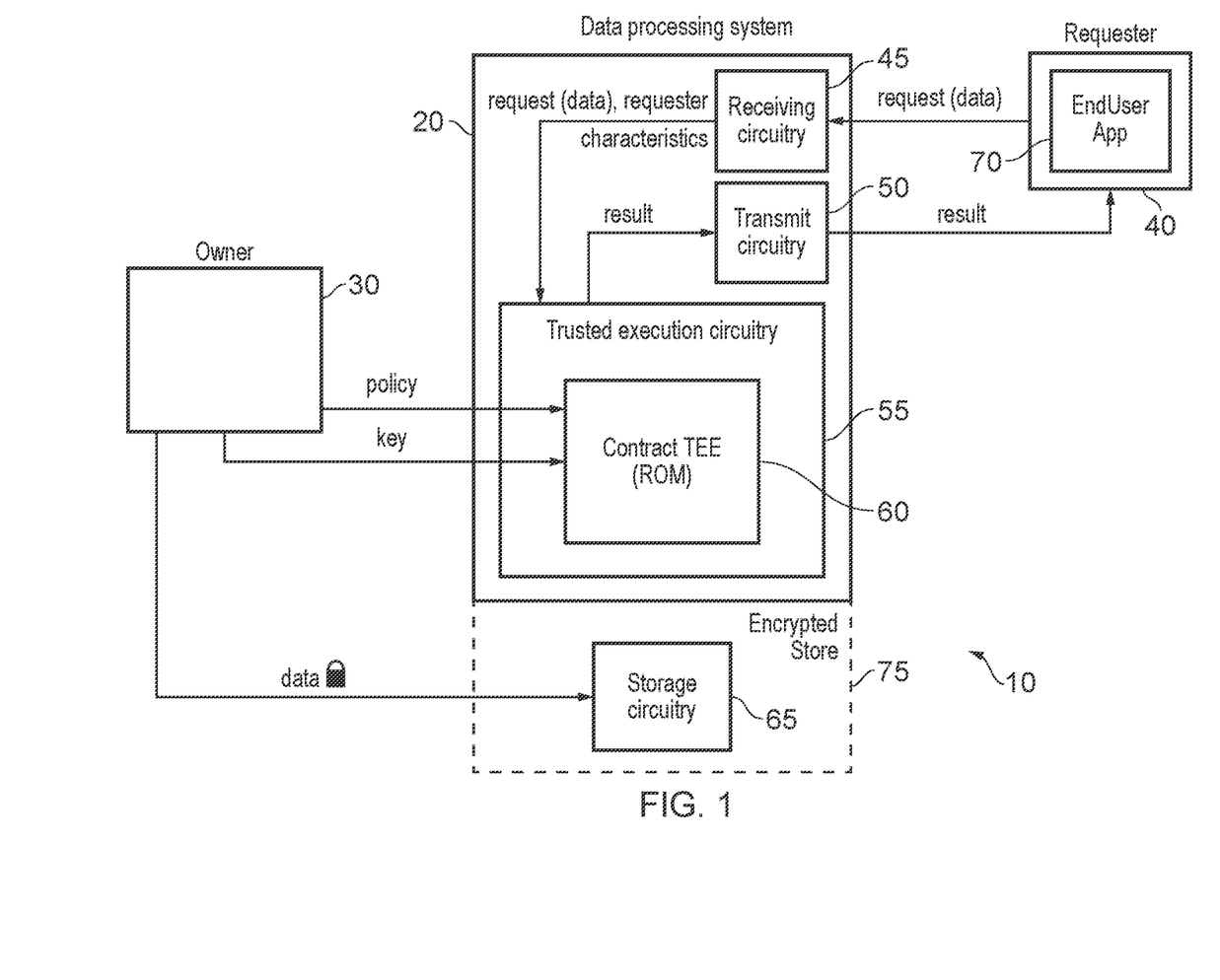
FIG. 1 illustrates a data processing system in accordance with some embodiments.

FIG. 1 illustrates a data processing system 10 comprising a data processing system 20 in accordance with some embodiments. The data processing system 20 is responsible for managing data that is provided by a data owner/provider 30 and managing that data so that it can be accessed in a restricted manner by a data requester 40. The data processing system 20 makes use of trusted execution circuitry 55 that implements a contract trusted execution environment (contract TEE) 60, which can also be referred to as an enclave, isolate, protected execution environment, or other term. The nature of the contract TEE 60 is that the software implementing the trusted execution environment cannot be modified without detection by the trusted execution circuitry. Consequently, it is possible to have a degree of certainty regarding the operation and behaviour of the data processing system 20. In particular, it can be safely assumed that the data processing system 20 will not simply disregard the requirements set out by the data owner 30 for the management of the data. For instance, the data processing system 20 will not simply give free access to all of the data to which it has access.

There are a number of ways of implementing a trusted execution environment 60. These techniques are beyond the scope of the present disclosure. However one method is to take a checksum or hash of the trusted execution environment 60 (either once or regularly). Using such a mechanism, changes to the behaviour of the trusted execution environment 60 can be detected by a change in the hash or checksum and consequently if the hash or checksum unexpectedly changes, then it may be assumed that a third party has modified the behaviour of the trusted execution environment 60. The trusted execution environment 60 can therefore be disabled or prevented from continuing to execute. Another technique, which is illustrated in FIG. 1, is to implement the contract TEE 60 on a read-only memory (ROM). Once data has been written to a ROM, it cannot be modified. In this way, the trusted execution environment 60 itself can be considered to be immutable and so its behaviour cannot be changed.

When the data owner 30 has data that is to be made available, the data is transmitted in an encrypted form to storage circuitry 65 that forms part of an encrypted store 75. The encrypted store 75 could be a separate apparatus or could be part of the data processing system itself. For example, the encrypted store 75 could form part of the trusted execution circuitry 55. In this example, the encrypted store 75 is shown as a separate element of the data processing system 20. Having provided the encrypted data to the storage circuitry 65 or the encrypted store 75, the data owner 30 provides a key to the encrypted data to the contract TEE 60. In addition, the owner 30 provides a data policy to the contract TEE 60. The key is used to decrypt or access the encrypted data and the policy dictates how the data can be used by other entities such as the requester 40. The key and the policy are received by the contract TEE 60, which securely stores them. In particular, the policy is stored in such a manner that the policy cannot be modified and the key is stored in such a manner that it cannot be accessed by any element other than the contract TEE 60. For example, the trusted execution circuitry 55 might provide secure storage circuitry that cannot be accessed from outside the trusted execution circuitry. This could take the form, for instance, of the encrypted store 75 that is also used to store the encrypted data in storage circuitry 65.

When an app 70 running on the requester 40 wishes to access data, a request for the data is transmitted to receiving circuitry 45 of the data processing system. From here, the request is processed by the trusted execution circuitry 55. In particular, the details of the request and the characteristics of the requester are assessed to determine whether the policy permits some or all of the requested data to be provided. If the request (some or all) can be fulfilled, then the trusted execution circuitry 55 issues a transmission to the requester via transmit circuitry 50 containing some of all of the data. In some embodiments, the request is for a specific operation to be performed on the data, and consequently, the trusted execution circuitry 55 provides not the data, but the result of performing that operation on the data. Similarly, in some situations, the request for all of the data that is made by the requester 40 cannot be fulfilled while other parts of the request can be fulfilled. In these situations, the trusted execution circuitry 55 may refuse the request altogether or may provide the part of the data that is permitted according to the policy.

Figure 2:
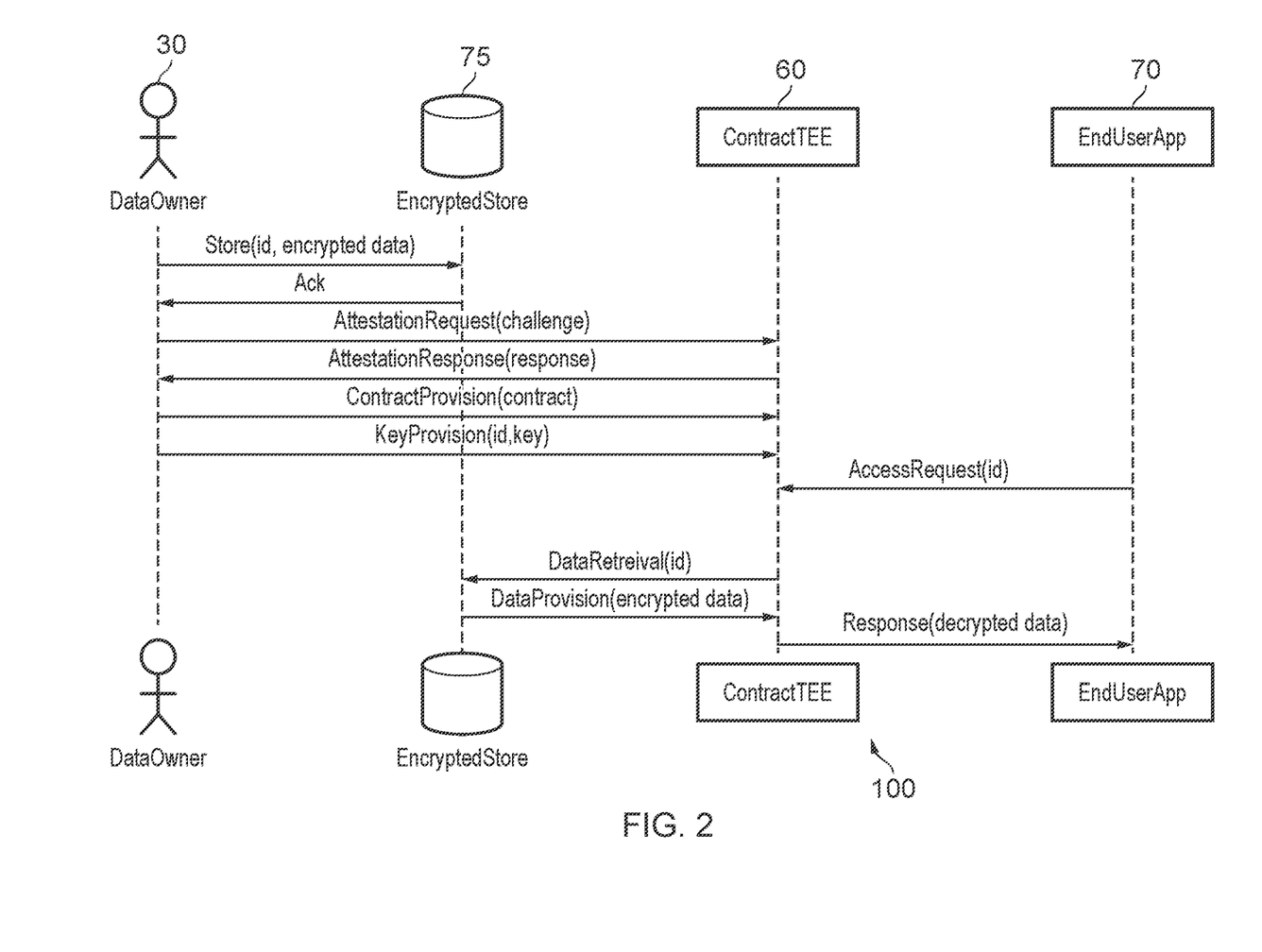
FIG. 2 illustrates a communication flow in accordance with some embodiments.

FIG. 2 illustrates a flow of communications 100 between a data owner 30, the encrypted store 75 a contract TEE 60, and an end user app 70 that executes on a requester 40. The example shown in FIG. 2 shows the exchange of messages that is achieved in order for the end user app 70 to access that data in accordance with a policy. The process begins by the data owner 30 transmitting a store request to the encrypted store 75 with the data, and ID of the data. The data that is transmitted as part of this store request is encrypted. The encrypted store 75 then responds to the data owner with an acknowledgement. An attestation request takes place between the data owner 30 and the contract TEE 60. This attestation request includes a challenge that must be responded to the by the contract TEE 60. The contract TEE 60 then replies with an attestation response including a response that corresponds with the provided challenge. The full attestation process is not illustrated here but typically involves the generation of a hash of the contract TEE 60 which is signed using a private key for which the data owner 30 has the corresponding public key. This makes it possible to confirm the behaviour of the contract TEE 60 by the data owner 30 comparing the hash against a collection (e.g. a database) of hashes of known/valid/legitimate/trusted contract TEEs. If the hash is found in the collection, then the data owner 30 can be confident that the behaviour of the contract TEE 60 has been assessed and has been determined as being secure. The use of a challenge and response is used in order to provide replay protection (e.g. by including a nonce). Consequently, the attestation response may include the hash of the contract TEE, and the challenge response, and the resulting attestation response might be signed in such a way that its origin can be established by the data owner 30.

When the data owner 30 receives the attestation response, it determines whether the challenge response corresponds with the challenge that was provided. If not, then the data owner 30 can conclude that the attestation response that was received was part of a replay attack and so refuses to attest to the contract TEE 60. Assuming that the attestation completes successfully, the data owner 30 provides a contract or policy as part of a contract provision message. This dictates the terms under which the data can be supplied by the contract TEE 60 to an end user app 70. In addition, the data owner 30 provides the key that is used to access the encrypted data in a key provision message. In this way, the contract TEE 60 is supplied with the contract under which the data can be accessed, and the means to access the data.

In due course, the end user app 70 requests access to the data having the ID 'id'. This request is sent to the contract TEE 60. In response, the contract TEE 60 issues a data retrieval request to the encrypted store 75 for the encrypted data. The encrypted store 75 accesses the data corresponding to the supplied ID, and returns the encrypted data in a data provision message. Here, the contract TEE 60 determines whether the end user app 70 meets the requirements set out in the policy for the requested data. If so, the data is decrypted using the key and the resulting decrypted data is sent as part of a response to the end user app 70.

As a consequence of this, the end user app 70 never has access to the key that is used to decrypt the data. Instead, the encrypted data is kept in an encrypted form in the encrypted store 75 so that it cannot be accessed by anything other than the contract TEE 60 or the data owner 30 themselves.

Contract TEE 60 decrypts the data and makes it available if the terms under which the data is to be used matches the policy or contract that was originally provided by the data owner 30 for that data. Consequently, the terms under which the data owner 30 has set out of the use of the data are enforced. At the same time, the contract TEE 60 cannot be circumvented, because any change to the contract TEE 60 can be detected. Similarly, the key cannot be extracted because it is securely stored as part of the contract TEE 60.

The policy restricts the use of the data based on characteristics of the end user app 70. There are a number of ways in which this policy can be implemented.

Figure 3:
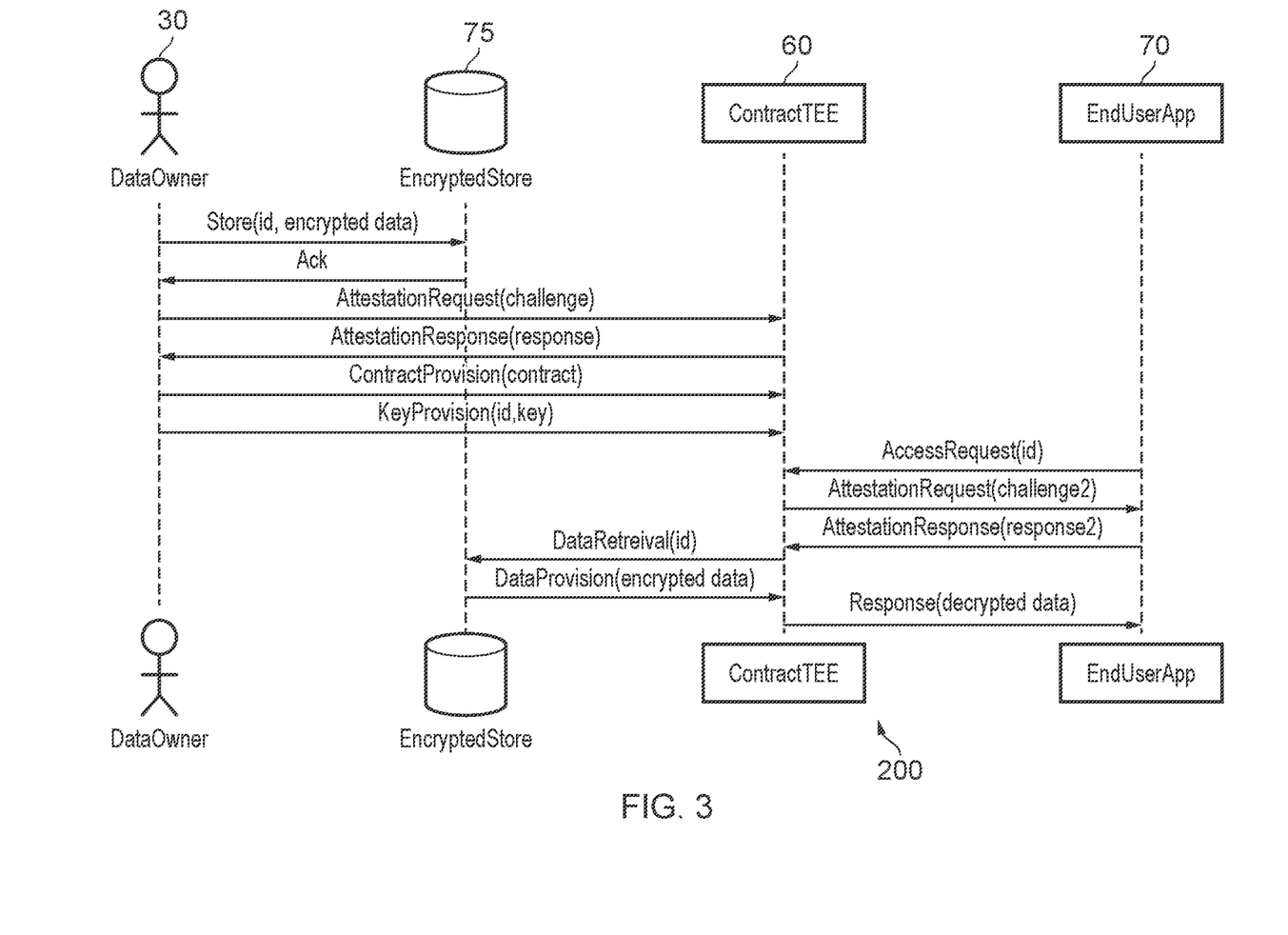
FIG. 3 illustrates a communication flow in accordance with some embodiments.

In the example shown in FIG. 3, the policy or contract that is enforced by the contract TEE 60 requires that the end user app 70 be attested to with a contract TEE 60 before any data can be supplied. This means that the underlying behaviour of the end user app 70 is known to the contract TEE 60. In particular, the data may not be provided to an end user app 70 whose behaviour is unknown or whose behaviour is considered to be inappropriate in respect of the supplied data. Attestation can be provided where end user app 70 is able to guarantee the safety and security of the underlying data—e.g. by not resupplying it to other parties. The process 200 described in FIG. 3 therefore proceeds in the same way up until the provision of the key by the data owner 30 to the contracted TEE 60. At this point, when the end user app 70 requests access to the data having the specified ID, an attestation request is made to the end user app 70 by the contract TEE 60. As with the attestation request performed between the data owner 30 and the contract TEE 60, a challenge (challenge2) is supplied. The end user app 70 must then provide, as part of the attestation response, a response to this challenge (response2). As with the other attestation process previously described, a hash or checksum of the user app 70 can be supplied so that the behaviour can be compared to a collection (e.g. database) of known, legitimate applications to which data can be provided. Assuming that this completes successfully, the contract TEE 60 retrieves the data from the encrypted store 75, decrypts the data and provides the decrypted data to the end user app 70.

Note that is both of these examples, the decrypted data is provided directly. As previously described, it is possible for the access request to include an operation that is to be performed on the data. In these examples, rather than the response providing the data, the response provides a result of performing the operation on the data, provided the contract or policy permits this operation to be performed. Similarly, in some examples, the data need not be fully decrypted in order for the operation to be performed. Thus, an operation is performed on the encrypted data to receive a decrypted result of the operation being performed on the decrypted data, even though the encrypted data is never decrypted.

Figure 4:
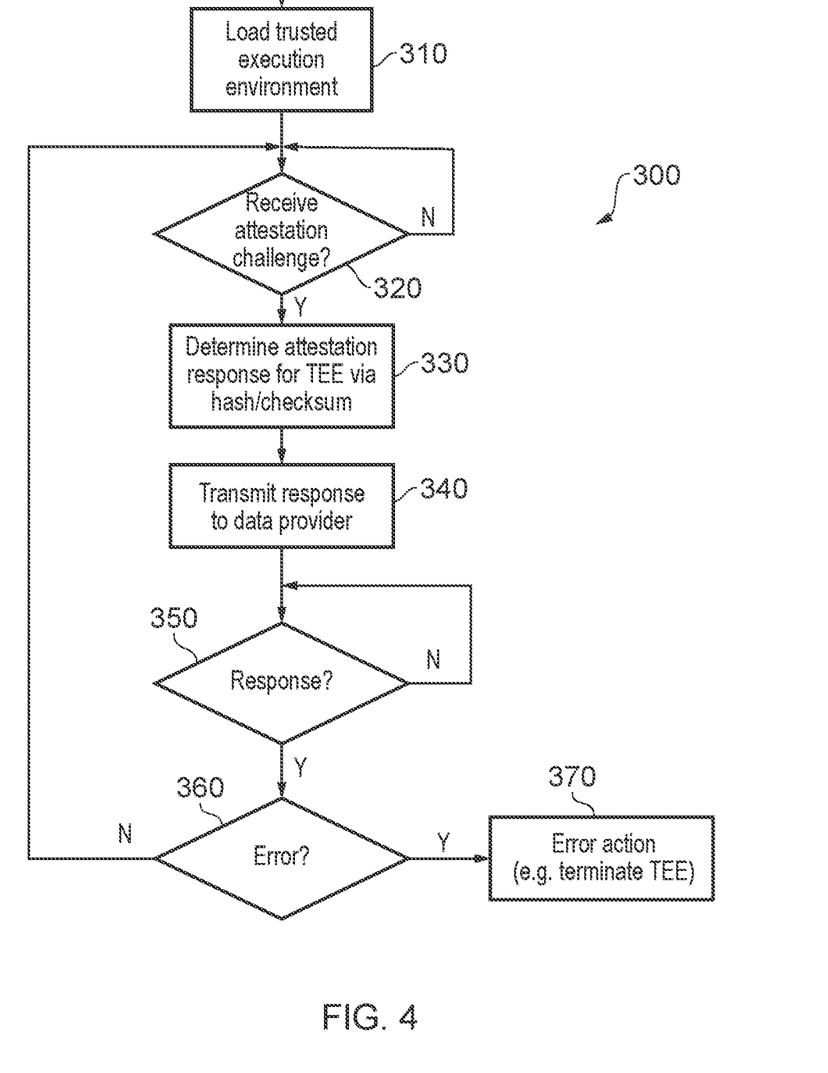
FIG. 4 illustrates a flowchart for maintaining trusted execution environment integrity, in accordance with some embodiments.

FIG. 4 illustrates a flow chart 300 that shows a process of confirming the integrity of the trusted execution environment 60 at the trusted execution circuitry 55. The process that is described here once again uses the process of attestation. At a step 310, the trusted execution environment 60 is loaded by the trusted execution circuitry 55. At a step 320, an attestation challenge is received. This could be received from the data provider/owner 30, for instance. At a step 330, an attestation response is determined. This could be determined by the trusted execution circuitry 55 (or firmware) on the data processing system 20 calculating a checksum or hash of the trusted execution environment 60 that is being executed (e.g. the working memory of the trusted execution environment and/or the actual series of instructions that make up the trusted execution environment as an executable file). If the attestation request includes a challenge in order to prevent replay attacks then the attestation response must also include the appropriate response and response mechanism can also be provided. Note that the trusted execution circuitry and/or the firmware is considered to be trusted so that it cannot simply respond with a known, permitted trusted execution environment. Having generated the appropriate response, the response is issued to, for example, the data provider 30 at a step 340. It is then determined by the data provider whether the attestation response is valid. In particular, the hash can be checked against a collection (e.g. database) of known and trusted execution environments. In addition, any challenge response to the provided challenge is checked to determine that this is correct. A response is then made, which is transmitted to the trusted execution circuitry 55. At step 360, it is determined if the response is an error (e.g. an attestation failure If the attestation response is considered to be an error, then the process ends at step 370 where an error action is taken. In this situation no decryption key is provided. Furthermore, the data processing system could inhibit the trusted execution environment from executing further. This is because the trusted execution environment 60 has failed attestation and cannot therefore be trusted.

If the response is considered to be valid (e.g. the decryption key is provided), then attestation has been achieved and the process, in this example, returns to step 320 to await a later further attestation request. That is, in this example, attestation is periodically required to try and ensure that the trusted execution environment has not been tampered with. In other examples, tamper protection is provided by the use of secure/isolated/read-only memory which prevents the TEE from being modified.

Note that the above process is performed each time a trusted execution environment is loaded. That is, since a trusted execution environment cannot be tampered with, if it is desirable to change the behaviour of the data processing system, this can be achieved by deleting the current trusted execution environment and loading a new (modified) trusted execution environment on the trusted execution circuitry that embodies the newly desired behaviour. The new trusted execution environment would be expected to undergo attestation again with, for instance, the data provider/owner 30 before being provided with the key to the encrypted data, as illustrated in the flowchart 300.

Figure 5:
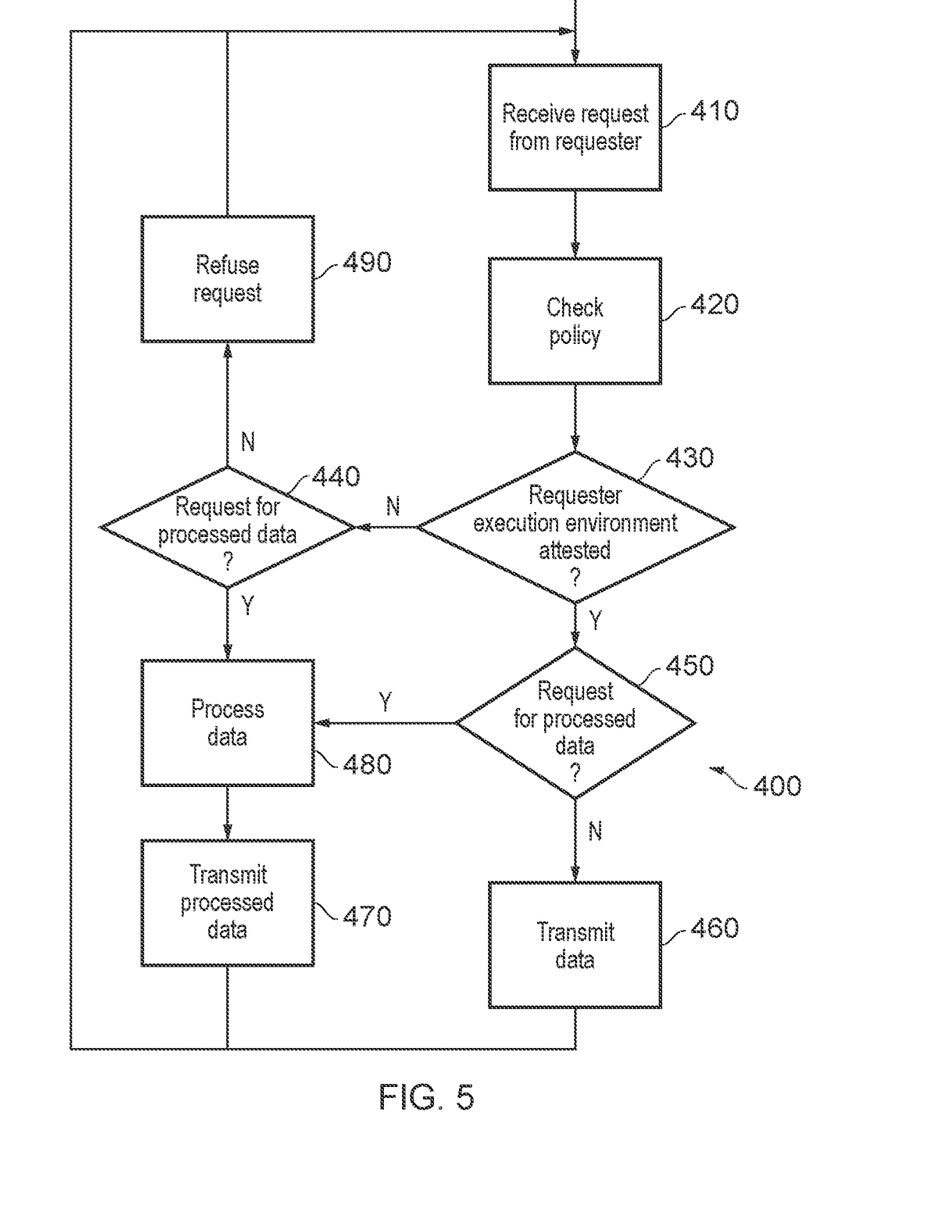
FIG. 5 illustrates a method of data processing in accordance with some embodiments.

FIG. 5 illustrates flow chart 400 that shows a process of handling the request that is received at the receiving circuitry 45 of the data processing system 20 from the end user app 70 of the requester 40. The process begins at a step 410 where the request is received. At a step 420, the request is checked against the policies that relate to the data that is being requested.

In this example, it is assumed that the policy permits processed data to be acquired by an unattested requester and for raw data to be obtained by an attested requester 0. This means that raw, specific data cannot be obtained by any application that is not trusted by the trusted execution environment 60. However, the result of particular operations may be permitted on that data.

The process proceeds to step 430 where it is determined whether the execution environment responding to the end user app 70 is attested. If not, then the process proceeds to step 440 where it is determined whether a request for processed data (as opposed to raw data) is being made. If not (i.e. if raw data is being requested), then the request is refused at step 490 and the process returns to step 410. If so, then at step 480 the data is processed. At step 470, the processed data is then transmitted, and the process returns to step 410. Consequently, a non-attested application can fulfil a request for processed data, however, a request for raw data is refused.

If, at step 430, the end user application 70 is attested, then at step 450 it is determined whether the request is being made for processed data or not. If so, then at step 480, the data is processed as previously described and transmitted as previously described at step 470. Consequently, the attested application can still request processed data. If a request for processed data is not being made at step 450 (i.e. if the request is for raw data), then at step 460 the raw data is transmitted. That is, an attested application can a request for the raw data be provided.

In this way, the owner 30 is able to set a policy in which the data may be accessed in its raw form by a trusted, attested application. In other situations, requesters are able to perform operations on the data, cannot access the raw data itself. This provides a measurement of security for the data, such as anonymity for the original data.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. A data processing system comprising:
   receiving circuitry configured to receive, from a requester, a request for the requester to use decrypted data obtained by decrypting encrypted data;
   trusted execution circuitry configured to provide a trusted execution environment, wherein the trusted execution circuitry is configured to:
   securely store a policy;
   acquire a key within the trusted execution environment, wherein the key is associated with the decrypted or encrypted data; and
   in response to the request and based on one or more characteristics of the requester and the policy, performing decryption on the encrypted data and transmitting the decrypted data to the requester.

2. The data processing system according to claim 1, comprising:
   storage circuitry configured to store the encrypted data.

3. The data processing system according to claim 1, wherein
   the trusted execution environment is immutable.

4. The data processing system according to claim 1, wherein
the policy is stored securely by storing the policy within the trusted execution environment.

5. The data processing system according to claim 1, wherein
the trusted execution circuitry is configured to obtain attestation of the trusted execution environment.

6. The data processing system according to claim 5, wherein
the trusted execution circuitry is configured to obtain the attestation by providing a digitally signed checksum or hash that corresponds with the trusted execution environment to a provider of the data.

7. The data processing system according to claim 5, wherein
in response to a failure to obtain the attestation of the trusted execution environment, the trusted execution circuitry is configured to perform an error action.

8. The data processing system according to claim 7, wherein
the error action is to inhibit execution of the trusted execution environment.

9. The data processing system according to claim 6, wherein
the checksum or hash corresponds with the trusted execution environment and a challenge received from the provider of the data; and
the digitally signed checksum or hash is signed such that an origin of the checksum or hash can be authenticated.

10. The data processing system according to claim 1, wherein
the request identifies a function to be performed on the decrypted data by the trusted execution circuitry to produce a result; and
the trusted execution circuitry configured to respond to the request by providing the result based on the policy and one or more characteristics of the requester.

11. The data processing system according to claim 10, wherein
the trusted execution circuitry configured to respond to the request by providing the result without providing the decrypted data based on the policy and the one or more characteristics of the requester.

12. The data processing system according to claim 1, wherein
the trusted execution circuitry is configured to accept and respond to the request when the one or more characteristics of the requester correspond with one or more required characteristics specified by the policy.

13. The data processing system according to claim 12, wherein
the one or more required characteristics comprise that the requester is a further trusted execution environment.

14. The data processing system according to claim 13, wherein
the one or more required characteristics comprise that attestation of the further trusted execution environment has been performed by the trusted execution environment.

15. A computer-implemented data processing method comprising:
receiving from a requester, a request for the requester to use decrypted data obtained by decrypting encrypted data;
providing a trusted execution environment, wherein the trusted execution environment:
securely stores a policy;
acquires a key, wherein the key is associated with the decrypted or encrypted data; and
in response to the request and based on one or more characteristics of the requester and the policy, performing decryption on the encrypted data and transmitting the decrypted data to the requester.

16. A data processing system comprising:
means for receiving from a requester, a request for the requester to use decrypted data obtained by decrypting encrypted data;
means for providing a trusted execution environment;
means for securely storing a policy;
means for acquiring a key within the trusted execution environment, wherein the key is associated with the decrypted or encrypted data; and
means for, in response to the request and based on one or more characteristics of the requester and the policy, performing decryption on the encrypted data and transmitting the decrypted data to the requester.

* * * * *